United States Patent
Kasperchik et al.

(10) Patent No.: US 10,533,106 B2
(45) Date of Patent: *Jan. 14, 2020

(54) NON-NEWTONIAN WHITE INKS

(71) Applicant: Hewlett-Packard Development Company, L.P., Fort Collins, CO (US)

(72) Inventors: Vladek Kasperchik, Corvallis, OR (US); Paul Joseph Bruinsma, San Diego, CA (US); Thomas W. Butler, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 211 days.

This patent is subject to a terminal disclaimer.

(21) Appl. No.: 15/561,712

(22) PCT Filed: Jul. 20, 2015

(86) PCT No.: PCT/US2015/041184
§ 371 (c)(1),
(2) Date: Sep. 26, 2017

(87) PCT Pub. No.: WO2017/014747
PCT Pub. Date: Jan. 26, 2017

(65) Prior Publication Data
US 2018/0086933 A1    Mar. 29, 2018

(51) Int. Cl.
*C09D 11/54* (2014.01)
*C09D 11/106* (2014.01)
(Continued)

(52) U.S. Cl.
CPC .............. *C09D 11/54* (2013.01); *C09C 3/063* (2013.01); *C09D 11/106* (2013.01);
(Continued)

(58) Field of Classification Search
None
See application file for complete search history.

(56) References Cited

U.S. PATENT DOCUMENTS

| 2,187,050 A | 1/1940 | Patterson |
| 3,437,502 A | 4/1969 | Werner |

(Continued)

FOREIGN PATENT DOCUMENTS

| EP | 1784462 | 5/2007 |
| EP | 2243807 | 10/2010 |

(Continued)

OTHER PUBLICATIONS

"Ti-Pure R-960 Datasheet" from The Chemours Company TT, LLC, 2015; 2 pages; https://www.chemours.com/Titanium_Technologies/en_US/assets/downloads/Ti-Pure-R-960-coatings-product-information.pdf.*

(Continued)

*Primary Examiner* — Helene Klemanski
(74) *Attorney, Agent, or Firm* — Thorpe North & Western LLP (57) ABSTRACT

The present disclosure provides an example where a non-Newtonian white ink can include an aqueous ink vehicle, from 5 wt % to 60 wt % of white colorant, and from 0.1 wt % to 5 wt % of amphoteric alumina particles dispersed in the aqueous ink vehicle. The white colorant can include white metal oxide pigment having an average particulate size from 100 nm to 2,000 nm, an alumina coating on the white metal oxide pigment forming an alumina-coated pigment, and a polymeric dispersant associated with a surface of the alumina-coated pigment. The amphoteric alumina particles can have an average particles size from 2 nm to less than 100 nm.

20 Claims, 5 Drawing Sheets

(51) Int. Cl.
  *C09D 11/322* (2014.01)
  *C09D 11/38* (2014.01)
  *C09C 1/00* (2006.01)
  *C09C 1/04* (2006.01)
  *C09C 1/36* (2006.01)
  *C09C 3/06* (2006.01)
  *C09D 11/326* (2014.01)

(52) U.S. Cl.
  CPC ............ *C09D 11/326* (2013.01); *C09D 11/38* (2013.01); *C01P 2004/62* (2013.01); *C01P 2004/64* (2013.01)

(56) References Cited

U.S. PATENT DOCUMENTS

| | | |
|---|---|---|
| 3,529,985 A | 9/1970 | Jester et al. |
| 3,926,660 A | 12/1975 | Holle et al. |
| 4,075,031 A | 2/1978 | Allen |
| 4,376,655 A | 3/1983 | Weber |
| 4,416,699 A | 11/1983 | Jacobson |
| 5,332,433 A | 7/1994 | Story et al. |
| 5,439,514 A | 8/1995 | Kashiwazaki et al. |
| 5,702,519 A | 12/1997 | Nitta et al. |
| 6,610,136 B2 | 8/2003 | Malla et al. |
| 6,666,913 B2 | 12/2003 | Hirano et al. |
| 6,989,054 B2 | 1/2006 | Tanabe et al. |
| 7,217,386 B2 | 5/2007 | Wan et al. |
| 7,264,672 B1 | 9/2007 | Trabzuni et al. |
| 7,276,231 B2 | 10/2007 | Frerichs et al. |
| 7,919,544 B2 | 4/2011 | Matsuyama et al. |
| 8,105,432 B2 | 1/2012 | Bettler et al. |
| 8,348,411 B2 | 1/2013 | Brust et al. |
| 8,404,761 B2 | 3/2013 | Shinozaki et al. |
| 8,440,744 B2 | 5/2013 | Sugita et al. |
| 8,466,213 B2 | 6/2013 | Ueno et al. |
| 8,574,356 B2 | 11/2013 | Kagata et al. |
| 8,784,550 B2 | 7/2014 | Kasperchik |
| 8,859,061 B2* | 10/2014 | Kasperchik .......... B41M 5/5218 106/31.65 |
| 9,080,072 B2* | 7/2015 | Kabalnov ............... C09D 11/38 |
| 9,133,358 B2* | 9/2015 | Kasperchik .......... C09D 11/322 |
| 9,394,453 B2 | 7/2016 | Ng et al. |
| 9,631,104 B2* | 4/2017 | Adamic ............... C09D 11/322 |
| 9,732,246 B2* | 8/2017 | Adamic, Jr. ........... C09D 11/38 |
| 9,822,270 B2* | 11/2017 | Adamic ................. C09D 11/40 |
| 9,963,607 B2* | 5/2018 | Adamic ............ B41M 5/0023 |
| 10,167,400 B2* | 1/2019 | Bruinsma ............ C09D 11/102 |
| 10,167,406 B2* | 1/2019 | Bruinsma ................. C09C 1/00 |
| 10,273,374 B2* | 4/2019 | Bruinsma ............. C09D 11/40 |
| 2003/0056693 A1 | 3/2003 | Hayashi et al. |
| 2007/0060670 A1 | 3/2007 | Ellis |
| 2010/0105807 A1 | 4/2010 | Sugita et al. |
| 2010/0222492 A1 | 9/2010 | Sarkisian et al. |
| 2011/0169887 A1 | 7/2011 | Kabalnov et al. |
| 2011/0184108 A1 | 7/2011 | Okuda et al. |
| 2011/0281032 A1 | 11/2011 | Kagata et al. |
| 2013/0160672 A1 | 6/2013 | Kasperchik |
| 2013/0224451 A1* | 8/2013 | Shiono ................... C09D 11/38 428/207 |
| 2014/0123874 A1 | 5/2014 | Kabalnov et al. |
| 2014/0261086 A1 | 9/2014 | Goparaju et al. |
| 2014/0352573 A1 | 12/2014 | Kasperchik et al. |
| 2015/0184010 A1 | 7/2015 | Okada et al. |
| 2016/0355696 A1* | 12/2016 | Adamic, Jr. ......... C09D 11/322 |
| 2017/0355867 A1* | 12/2017 | Kasperchik .......... C09D 11/106 |
| 2018/0002555 A1* | 1/2018 | Kasperchik .......... C09D 11/106 |
| 2018/0086933 A1 | 3/2018 | Kasperchik et al. |
| 2018/0100078 A1* | 4/2018 | Kasperchik ............. C09C 3/063 |
| 2018/0105714 A1* | 4/2018 | Kasperchik ............. C09C 3/006 |

FOREIGN PATENT DOCUMENTS

| | | |
|---|---|---|
| JP | 2004124077 | 4/2004 |
| JP | 2005298802 | 10/2005 |
| JP | 2011225867 | 11/2011 |
| JP | 2012241057 | 12/2012 |
| JP | 5519112 | 6/2014 |
| WO | 9718268 | 5/1997 |
| WO | 2007124120 | 11/2007 |
| WO | 2012054052 | 4/2012 |
| WO | 2012170032 | 12/2012 |
| WO | 2013162513 | 10/2013 |
| WO | 2014193387 | 12/2014 |
| WO | WO 2016/175871 A1 * | 11/2016 |
| WO | WO 2018/190848 A1 * | 10/2018 |

OTHER PUBLICATIONS

"DuPont Ti-Pure R-960 Datasheet" from The Chemours Company TT, LLC, 2012; 1 page; https://www.chemours.com/Titanium_Technologies/en_US/products/960/Ti-Pure_R-960_datasheet_H65960-8_022912.pdf.*

International Search Report and Written Opinion dated Nov. 17, 2015 for PCT/US2015/041184; Applicant Hewlett-Packard Development Company L.P.

* cited by examiner

NON-NEWTONIAN WHITE INKS

BACKGROUND

The use of inkjet printing systems has grown dramatically in recent years. This growth may be attributed to desirability in print resolution and overall print quality coupled with appreciable reduction in cost. Today's inkjet printers offer acceptable print quality for many commercial, business, and household applications at lower costs than comparable products available just a few years ago. Notwithstanding their recent success, research and development efforts continue toward advancing inkjet print quality over a wide variety of different applications, but there remain challenges.

BRIEF DESCRIPTION OF THE DRAWINGS

Additional features and advantages of the disclosure will be apparent from the detailed description which follows, taken in conjunction with the accompanying drawings, which together illustrate, by way of example, features of the present technology.

Reference will now be made to certain technology examples illustrated, and specific language will be used herein to describe the same. It will nevertheless be understood that no limitation of the scope of the disclosure is thereby intended.

DETAILED DESCRIPTION

Certain pigments can be more challenging than other in achieving certain desirable printing and jetting properties. For example, ink opacity corresponding to white color appearance can be more difficult to achieve for white inks compared to black, magenta, or cyan inks. Additionally, high colorant loads and large pigment particle sizes can lead to settling that clogs inkjet printheads and other microchannels. More specifically, the combination of high bulk densities and larger particle sizes tend to lead to high settling rates of the pigment in water-based inkjet ink formulations, and these larger and denser pigments can form a sediment very rapidly, e.g., within a few days. Once the sediment has formed, the gravitational forces tend to lead to a tight compaction or cemented sediment, which is very challenging to resuspend, plugging printheads and microchannels, etc. Prolonged stirring or shaking may not be sufficient to break down the aggregated particles in the sediment to unclog blocked channels and restore the settled ink to its original useable state. Furthermore, irreversible pigment settling can also reduce print quality because the formation of non-redispersible pigment sediment depletes bulk pigment concentration in the ink liquid portion that remains, compromising print opacity. In a more extreme case, settling in a manner where resuspension cannot be achieved may even render the ink substantially transparent.

Thus, the present disclosure is drawn to white inks, including water-based white inkjet inks, that can be jetted from various types of inkjet printheads, but which can also be particularly friendly for use in thermal inkjet printheads. These inks, in some instances with the assistance of a fixer coating layer or fixer ink, can be printed not only on porous media, but also effectively on more challenging non-porous polymer media.

Figure 1A:
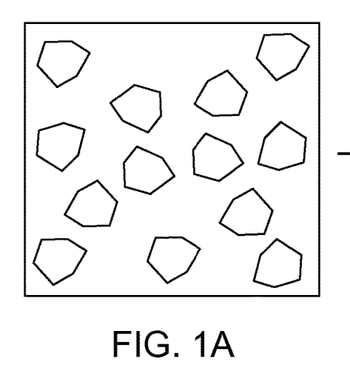
FIG. 1A depicts dispersed white metal oxide pigment.
Figure 1B:
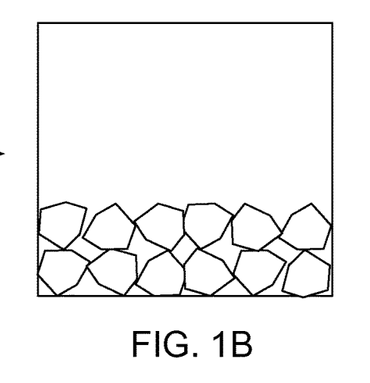
FIG. 1B depicts typical settling that occurs with white metal oxide pigment, such as $TiO_2$, over a short amount of time.

The non-Newtonian white inks of the present disclosure address issues related to system reliability and print opacity performance of white inks that use relatively large and dense white metal oxide pigment particles. To illustrate, high bulk density of white metal oxide pigment, such as $TiO_2$, which have a relatively large particle size, e.g., from 100 nm to 2000 nm, from 150 nm to 750 nm, or from 200 nm to 500 nm, can be used to provide high opacity performance. However, the high bulk density, e.g., about 4.2 for the rutile form, and large size also can result in fast settling of the pigment in low viscosity water-based inkjet ink formulations. More specifically, $TiO_2$ particles (See FIG. 1A) can easily agglomerate resulting in a sediment (See FIG. 1B) that is difficult to break apart, e.g., layers with very strong inter-particle cohesion are formed. This can clog fluidic pathways of ink delivery systems and inkjet printheads, rendering the printing device non-operational within few days.

Figure 1C:
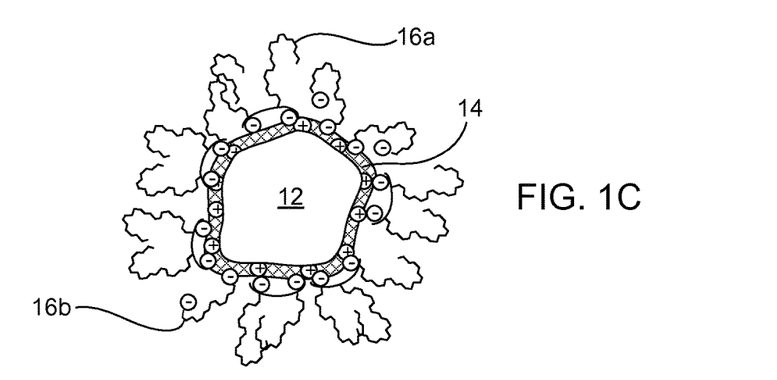
FIG. 1C depicts an example white metal oxide pigment, such as $TiO_2$, with a cationic alumina surface coated by dense layer of two different types of polymeric dispersant in accordance with examples of the present disclosure.
Figure 1D:
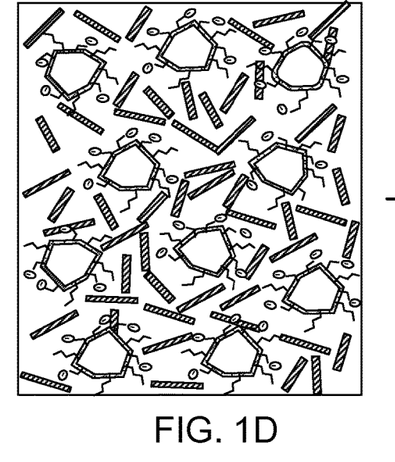
FIG. 1D depicts white metal oxide pigment prepared in accordance with examples of the present disclosure that is co-dispersed with amphoteric alumina particles.
Figure 1E:
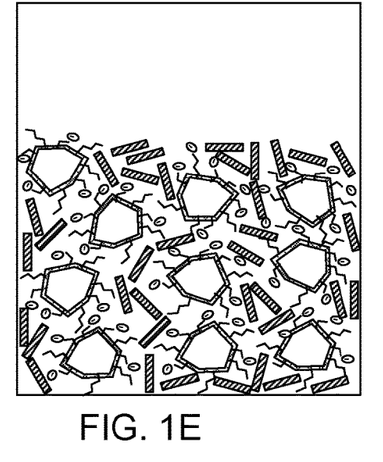
FIG. 1E depicts settling that occurs over time to form flocculated masses in accordance with examples of the present disclosure.

Because it can be difficult to completely eliminate settling of large dense particles in low viscosity environments, reducing settling rate or allowing for settling in a manner that produces a more easily resuspendable sediment provides a good solution. For example, as shown in FIG. 1C, an example white metal oxide pigment 12, such as $TiO_2$, is coated with a cationic alumina (in some examples, also with silica) surface 14 by dense layer of two different types of polymeric dispersant, namely an adsorbed non-ionic or predominantly non-ionic polymer dispersant of a comb-type structure with anionic or acidic anchor group 16a, as well as an anionic dispersant 16b. Though two dispersants are shown, it is noted that many examples can be prepared with only one dispersant, or more than two dispersants. Thus, in accordance with examples of the present disclosure, white metal oxide pigment can be treated with alumina (with or without silica) to form a coating, and the coated pigment can be further dispersed with a polymeric dispersing agent with added alumina particles also included therein (See FIG. 1D). This formulation does not stop gravitational settling, but rather, provides conditions where a loose flocculated mass of pigment and alumina particles (See FIG. 1E) are formed that can be easily resuspended with minor agitation or shaking. Essentially, by milling alumina-coated white metal oxide pigment with the polymeric dispersant and by adding amphoteric alumina particles, the various particles form flocs or flocculated masses that allow for a more controlled destabilization of the pigment in the aqueous ink vehicle. By allowing sedimentation of the weakly associated colloid particles to occur (as loose flocs or flocculated masses), a fluffy sediment of low density is formed that can be easily resuspended without permanent clogging of the inkjet printhead and/or fluid channels. Thus, when settling, more benign flocculated masses of white metal oxide pigment form (rather than tightly packed pigment that is unrecoverable).

In further detail, dispersions of white pigment prepared as described herein can be co-dispersed or formulated with added amphoteric alumina particles to form white inks, and in the white inks. As a note, certain amphoteric aluminum oxide nano-particles which have both cationic and anionic sites when exposed to aqueous environment over a wide pH range can be used as added particles in the white inks of the present disclosure. Surface hydroxyl groups of such aluminum oxides may adsorb protons and form cationic sides, as follows:

$$AlOH + H^+ \rightarrow AlOH^{2+}$$

On the other hand surface hydroxyls may be also deprotonated and form anionic sites:

$$AlOH + OH^- \rightarrow AlO^- + H_2O$$

The distribution of surface charges on nano-particles of some amphoteric aluminum oxides may be anisotropic. This behavior is especially pronounced for aluminum oxo-hydroxide AlO(OH), also known as boehmite. This is because boehmite nano-particles in aqueous dispersions can easily aggregate into complex network of structures. TEM evidence of aggregation of boehmite nano-particles into continuous 3-dimensional network (viewed under magnification, e.g., ~200K) indicates the formation of these structures. Furthermore, boehmite nano-particles, and other alumina particles, can attach or adsorb to a surface of metal oxide particles, including white metal oxide pigments described herein, to further assist with achieving the flocculated masses described herein.

In further detail, alumina particles, such as boehmite nano-particles, can self-aggregate and adsorb to surface of large white metal oxide particles and can further be suspended in a white ink for providing controlled destabilization of white ink formulations. To illustrate, titanium dioxide (TiO$_2$) pigment particles in ink formulation can agglomerated into loose flocs as shown previously in FIG. 1E where a network of amphoteric alumina oxide particles with large pigment particles become trapped inside the network. Settling of these loose flocs or flocculated masses produces loose low-density sediment with very weak mechanical properties. Minor agitation, such as might occur with ink recirculation in the inkjet printer printhead and/or ink supplies can be sufficient for quick system recovery into an operational state after long term inactivity.

In accordance with this, the present disclosure is drawn to a non-Newtonian white ink, including an aqueous ink vehicle, from 5 wt % to 60 wt % of white colorant, and from 0.1 wt % to 5 wt % of amphoteric alumina particles having an average particle size from 2 nm to less than 100 nm. The white colorant can include white metal oxide pigment having an average particulate size from 100 nm to 2,000 nm, an alumina coating on the white metal oxide pigment forming an alumina-coated pigment, and a polymeric dispersant associated with a surface of the alumina-coated pigment. In one example, the alumina coating includes silica as well as alumina. In one example, the non-Newtonian white ink can further include from 2 wt % to 30 wt % of latex particles. In another specific example, the white metal oxide pigment can have a refractive index of 1.8 to 3.0, a bulk density from 3.0 to 4.5. Thus, since this size of pigment and this bulk density of pigment tends to settle rather quickly, by coating the white metal oxide pigment with alumina and associating the surface with polymeric dispersant, and by adding amphoteric alumina particles, when settling does occur, the white colorant can be easily resuspended from the white flocculated colorant mass in preparation for inkjet application. Thus, when resuspended, a homogenous or evenly distributed pigment dispersion can be readily formed from the flocculated colorant mass.

Regarding the non-Newtonian white ink, in one example, the alumina coating can further include silica. In another example, the non-Newtonian white ink can include 5 wt % to 50 wt % white metal oxide pigment, 0.05 wt % to 10 wt % alumina in the alumina coating, 0.005 wt % to 5 wt % polymeric dispersant; and from 0.5 wt % to 3 wt % amphoteric alumina particles having an average particle size from 5 nm to 30 nm. In another example, the white metal oxide pigment can include titanium dioxide particles, zinc oxide particles, zirconium oxide particles, or combinations thereof. In yet another example, the non-Newtonian white ink can further include latex particles having a glass transition temperature from −20° C. to 130° C. In another example, the polymeric dispersant can include a non-ionic or predominantly non-ionic dispersant defined by an acid number not higher than 100 mg KOH/g based on dry polymer weight, and wherein the polymeric dispersant further includes an anionic anchoring group attached to the alumina coating; and in one ore specific example, the polymeric dispersant can further include an anionic dispersant defined by having an acid number higher than 100 mg KOH/g based on dry polymer weight attached to the alumina coating. In another example, the non-Newtonian white ink can be in an agitated state so that the white colorant and the amphoteric alumina particles are fully suspended in the non-Newtonian white ink. In still another example, the white colorant and the amphoteric alumina particles can be in the form of a weakly associated flocculated mass upon settling of solids in the non-Newtonian white ink.

A method of making a non-Newtonian white ink can include milling a mixture of a white metal oxide pigment having an alumina coating and a polymeric dispersant in a water-based carrier to form a pigment dispersion, combining ink vehicle with the pigment dispersion to form a white ink with suspended white colorant, and adding amphoteric alumina particles to the mixture, the pigment dispersion, the white ink, or combination thereof. In one example, the method can include allowing the non-Newtonian white ink to destabilize causing the suspended white colorant and the amphoteric alumina particles to form a flocculated mass.

In further detail, the method can include allowing the non-Newtonian white ink to destabilize causing the suspended white colorant and the amphoteric alumina particles to form a flocculated mass. In another example, the method can include admixing latex particles to the mixture, the pigment dispersion, the white ink, or combination thereof, wherein the non-Newtonian white ink includes from 5 wt % to 60 wt % wt % of the suspended white colorant having an average particle size from 100 nm to 2,000 nm; from 0.05 wt % to 15 wt % of the alumina coating; from 0.005 wt % to 5 wt % of the polymeric dispersant; from 0.1 wt % to 5 wt % alumina particles having an average particle size from 2 nm to less than 100 nm; and from 2 wt % to 30 wt % of the latex particles having a glass transition temperature from −20° C. to 130° C.

A fluid set for inkjet imaging can include a non-Newtonian white ink and fixer fluid. The non-Newtonian white ink can include an aqueous ink vehicle, from 5 wt % to 60 wt % white colorant, and from 0.1 wt % to 5 wt % of amphoteric alumina particles having an average particle size from 2 nm to less than 100 nm. The white colorant can include white metal oxide pigment having an average particulate size from 100 nm to 2,000 nm, an alumina coating on the white metal oxide pigment forming an alumina-coated pigment, and a polymeric dispersant associated with a surface of the alumina-coated pigment. The fixer fluid can include aqueous fixer vehicle, and from 0.1 wt % to 25 wt % cationic polymer.

The fixer fluid can be formulated for inkjet application, or for analog application, e.g., rolling, brushing, curtain coating, blade coating, Meyer rod coating, etc. For example, the non-Newtonian white ink can be formulated for inkjet application upon agitation to resuspend white colorant and the amphoteric alumina particles, and the fixer fluid can be formulated for inkjet application having a viscosity from 1 cP to 35 cP at 25° C. Alternatively, the non-Newtonian white ink can be formulated for inkjet application upon agitation to resuspend white colorant and the amphoteric alumina particles, and the fixer fluid is formulated for analog application having a viscosity from 1 cP to 500 cP at 25° C.

In certain specific examples, other ranges of ingredients can be used, such as, independently, from 5 wt % to 50 wt % white metal oxide pigment, from 0.05 wt % to 10 wt % alumina in the alumina coating, from 0.005 wt % to 5 wt % polymeric dispersant; and/or from 0.5 wt % to 3 wt % amphoteric alumina particles having an average particle size from 5 nm to 30 nm.

These white non-Newtonian inks or dispersion can be prepared with good sediment redispersibility, and can be prepared by milling base white metal oxide pigment, e.g., $TiO_2$, powder where the pigment is coated with a gel-sol coating of alumina in water-based slurry containing about 20 wt % to about 70 wt % of the pigment/alumina particles and dispersant(s). For example, a non-ionic dispersant with an anionic anchoring group can be present at from 0.5 wt % to 4 wt % (of dry pigment weight), and if two dispersants are present, such as in the case of an anionic dispersant, this dispersant content can be at from 0.1 wt % to 1 wt % (of dry pigment weight). Milling can be carried out until a desired mean pigment particle size is achieved, such as at a size where appropriate light-scattering may occur. Other example ranges and/or component choices can likewise be selected in accordance with the disclosed technology.

As a note, a white ink or a white dispersion used to prepare the white ink can have "non-Newtonian" or "shear thinning" properties in relation to higher concentrations of weakly bound agglomerates or flocculated masses. For example, a non-Newtonian ink or dispersion may be defined such that the viscosity of an ink or dispersion measured at 10 $sec^{-1}$ shear rate is at least 10% higher than the viscosity of the ink or dispersion when measured at shear rate of 1000 $sec^{-1}$ at 25° C. Or, for example, a non-Newtonian ink or dispersion may have a viscosity measured at 10 $sec^{-1}$ shear rate that is at least 20% higher, 30% higher, 50% higher, 100% higher (2×), etc. than the viscosity of the ink or dispersion when measured at shear rate of 1000 $sec^{-1}$ at 25° C. In many examples, the shear rate difference can be much higher than 2 times, e.g., 5 times, 10 times, 20 times, etc. Thus, a white ink, depending on the concentration of pigment (with alumina coating and polymeric dispersant) and amphoteric alumina particles, can have a non-Newtonian character when the "colorant" and amphoteric alumina particles are in the form of a flocculated mass, and the non-Newtonian properties are reduced when the colorant is re-suspended in preparation for inkjet application, for example.

In further detail, when preparing the non-Newtonian white ink from the pigment/alumina/dispersant slurry, ink vehicle components can be added, such as water, organic co-solvent, surfactant, etc., to form the non-Newtonian white ink having from 5 wt % to 60 wt % colorant mass, from 10 wt % to 50 wt % colorant mass, from 15 wt % to 45 wt % colorant mass, from 20 wt % to 40 wt % colorant mass, from 10 wt % to 25 wt % colorant mass, from 5 wt % to 20 wt % colorant mass, from 10 wt % to 20 wt % colorant mass, etc., either in flocculated or resuspended form.

Furthermore, the amphoteric alumina particles, such as boehmite, can be added to the formulation either prior to milling, during milling, or after milling. If after milling, then the amphoteric alumina particles can be added prior to, at the same time, or after the addition of ink vehicle components. Notably, some of the ink vehicle components are initially part of the pigment dispersion, e.g., water and/or other ingredients that become part of the ink vehicle when additional ink vehicle components are added for finalizing the ink for use.

These non-Newtonian white inks can be used in forming white images on various media substrate, including smooth polymer (non-porous) media substrate, and can be printed in combination, as mentioned, with a fixer coated on the surface of the media. For example, a fixer with cationic polymer can be applied to the media substrate and can be formulated so that its cationic polymer interacts with any anionically charged components in the non-Newtonian white ink to immobilize the white metal oxide pigment.

In each of these examples, there are several advantages related to the inclusion of the modified white metal oxide pigment and the amphoteric alumina particles. For example, as mentioned, these solids allow for a controlled destabilization of the pigment in the aqueous ink vehicle, e.g., allowing weakly associated sedimentation of colloid particles to occur (as loose flocs) such that fluffy sediment of lower density flocs can be easily resuspended. Furthermore, as mentioned, these solids may also cooperate with other solids, e.g., the latex particles, to act as a spacer between white metal oxide pigment particles, thereby enhancing white print opacity, as will be described herein in greater detail.

Figure 2:
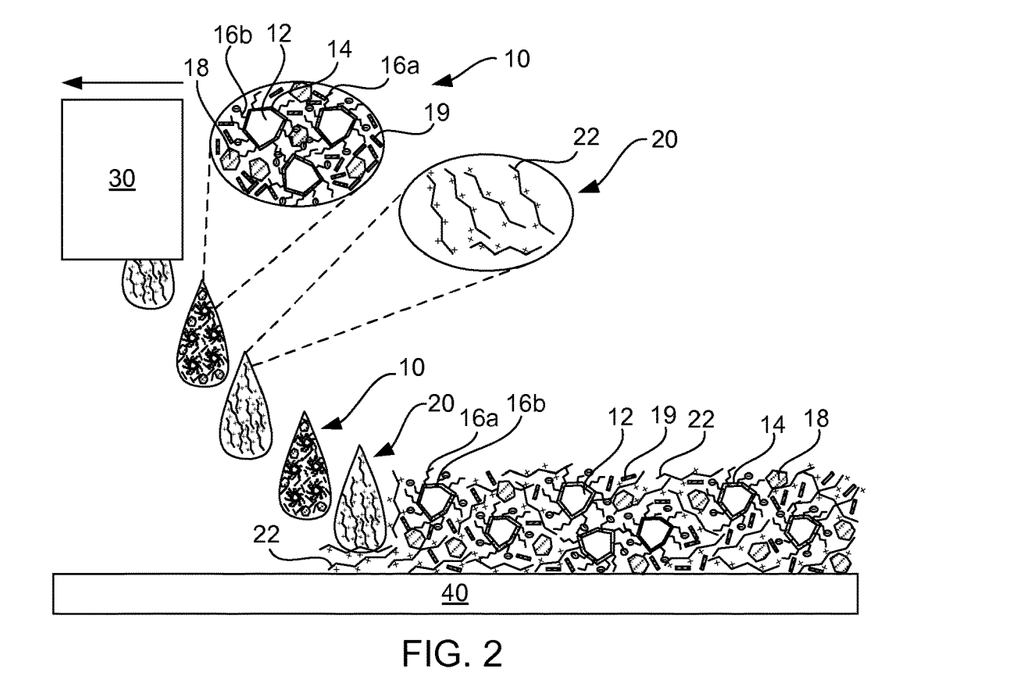
FIG. 2 depicts examples where a cationic polymer formulation is digitally printed on a media substrate contemporaneously or just before printing a non-Newtonian white inkjet ink thereon, and wherein the non-Newtonian white inkjet ink is prepared in accordance with examples of the present disclosure.
Figure 3:
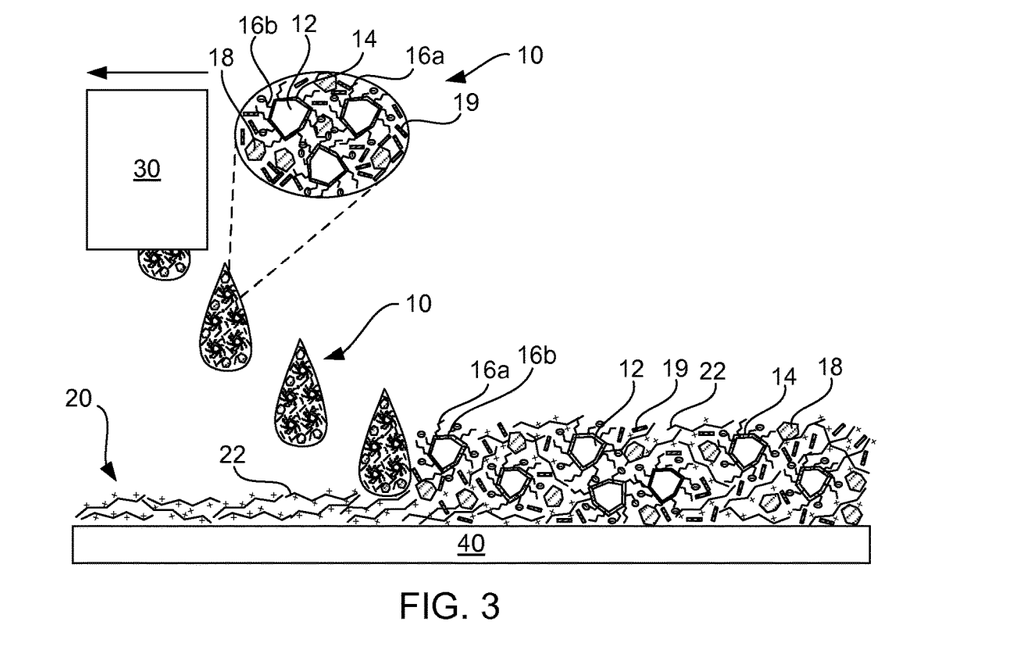
FIG. 3 depicts examples where a cationic polymer is applied to a media substrate prior to (either digital or by analog application) printing a non-Newtonian white inkjet ink thereon, and wherein the non-Newtonian white inkjet ink is prepared in accordance with examples of the present disclosure.

FIG. 2 depicts an example where a digitally printed fixer is applied just prior to or essentially simultaneously with a white inkjet ink of the present disclosure. FIG. 3 depicts an example where a fixer is applied to a media substrate prior to application of an inkjet ink. The fixer in this latter example can likewise be applied by digital printing, or alternatively, by analog application, e.g., rolling, brushing, curtain coating, blade coating, Meyer rod coating, or any other coating methodology suitable for producing thin layer of fixer on the printed substrate, etc. As shown in FIGS. 2 and 3, an inkjet printing device 30 is provided to digitally print a white inkjet ink 10, and in some examples, a fixer composition 20 on a media substrate 40. The media substrate can be a smooth, non-porous polymer substrate that is otherwise difficult to print on with high image quality and high durability. Specifically, FIG. 2 shows the fixer composition being printed digitally from the printing device, and FIG. 3 shows the fixer composition being pre-applied to the media substrate, either digitally or by an analog coating method. In both examples, the non-Newtonian white inkjet ink includes suspended white colorant that includes a white metal oxide pigment 12 with an alumina coating 14 and associated with polymeric dispersants 16a,16b. In this specific example, there are two types of polymeric dispersants, namely a non-ionic or predominantly non-ionic dispersant 16a and a short-chained anionic dispersant 16b, but this is not required. Latex particles 18 are also shown in the ink, all suspended by an aqueous ink vehicle, which typically includes water, organic co-solvent, and the like. Additionally, amphoteric alumina particles 19 are also co-dispersed therewith to assist in providing non-Newtonian or sheer thinning behavior to the white ink. Regarding the fixer composition 20, this formulation can include cationic polymer 22 dissolved in a fixer vehicle, wherein the cationic polymer is interactive with the suspended white colorant or other anionic components that may be found in the non-Newtonian white ink, thereby providing some immobilization or freezing of the pigment and particles on the print media substrate.

Figure 4:
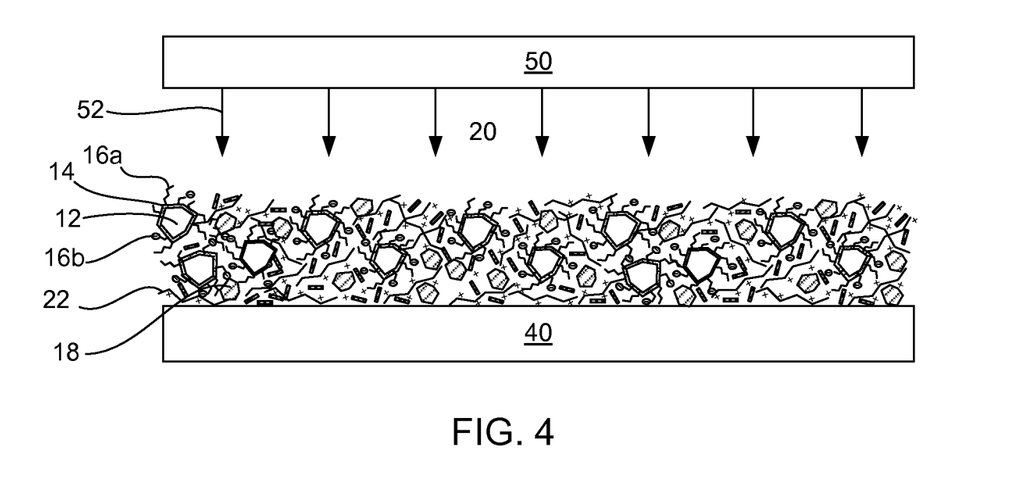
FIG. 4 depicts examples of heat drying and fusing an image printed in as described in FIG. 2 or 3 in accordance with examples of the present disclosure.
Figure 5:
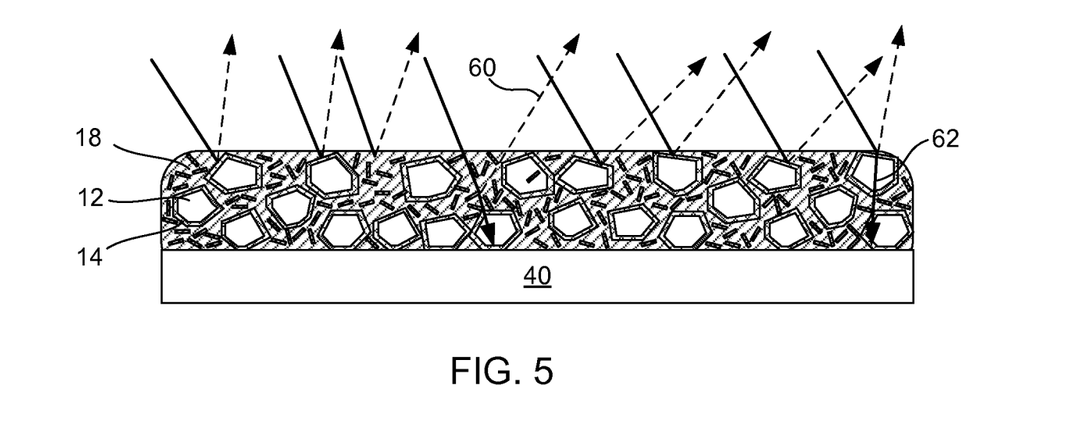
FIG. 5 depicts a printed article, such as that shown in FIG. 4, after heat fusing on the media substrate in accordance with examples of the present disclosure.

In another example, the image printed or otherwise generated in accordance with FIGS. 2 and 3 can be heat fused. More specifically, FIG. 4 shows a heat fusing device 50 which is used to apply heat 52 to the printed article to form a heat fused printed article as shown in FIG. 5. Because of the presence of both the alumina coating 14, the amphoteric alumina particles 19, and the latex particles 18 (heat fused as a non-continuous mass with other polymers that may be present) providing spacing between white metal oxide pigment particles 12, there can be enhanced light scattering 60 and lower transmittance 62 than even more densely packed white metal oxide pigment, which thus provides enhanced opacity. This increased opacity can be achieved by optically spacing the white metal oxide pigment from one another. For example, because of the relative high refractive index of the white metal oxide pigment and the relative low refractive index optical spacing provided by the alumina, latex, etc., the opacity of the printed coating can be boosted by from 0.1% to 25%, or more typically from 5% to 20% or from 5% to 25% compared to an inks without optical spacing material. In other words, the crowding effect of tightly-packed high refractive index (n) particles with little or no voids decreases light scattering and increase transparency of the coating. By optically spacing the white metal oxide pigment with the low refractive index materials (and typically heat fusing the latex after printing), an increase in opacity can be realized. As a further point, fusion can add enhanced durability to the printed article. In some cases, the fusing of the latex particles may help the latex polymer distribute more evenly between light scattering white metal oxide pigment particles and, hence, further enhance opacity as well. That, in combination with the presence of the alumina coating, can provide desirable results.

In accordance with this, a printed article can include up to 80 gsm, or up to 50 gsm, of a total fluids (white ink+fixer) applied to a media substrate. The term "up to 80 gsm" is used because typical inkjet images include fully imaged areas as well as non-imaged and/or lower density areas. After water and solvent(s) evaporation and fusing, the gsm roughly translates into 15-50 wt % of the initial fluid dispersion flux density, i.e. thus less than 60 gsm. In one example, full density inked area may be at from 30 to 60 gsm ink/fixer film, but densities lower in the tone ramp will be lower than this, thus the use of the phrase "up to" 75 gsm or "up to" 60 gsm. That being stated, though some areas on a media substrate might be at 0 gsm under this definition (unprinted areas), there will be areas that are imaged that range from greater than 0 gsm up to 60 gsm (after drying or heat fusing). In a typical printed article, there is a portion of the media that can be printed at from 5 gsm to 60 gsm.

Turning now to the various specific ingredients that are present in the non-Newtonian white ink, one of the ingredients included in the non-Newtonian white ink is a dispersion of amphoteric alumina particles, such as boehmite. A variety of water-dispersible alumina nano-powders and commercially available premade alumina dispersions can be used in the formulations. In some examples, the amphoteric alumina particles can have a particle size in the ink that is smaller than that of white metal oxide pigment, e.g., from 2 nm to 100 nm, from 2 nm to 50 nm, from 2 nm to 25 nm, or from 10 nm to about 15 nm, on average. For example, when using water-dispersible dry powders, a stock alumina nano-particle dispersion may be produced by milling the powder in aqueous environment at a pH from about 3.5 to about 5. The nano-particles can be premilled and added to the white ink, or can be milled with the alumina-coated white metal oxide pigment and polymeric dispersant.

In one example, a suitable alumina (boehmite) nano-particle dispersion can be prepared by milling Disperal® alumina powder (available from Sasol GmbH) in an Ultra Apex® Mill UAM-015 (available from Kotobuki Industries Co., Ltd). loaded with 50 μm YTZ beads. The milled slurry can include about 10 wt % to 40 wt % (or about 2 wt %) of the Disperal® alumina, in some examples. The particle size of the alumina after the milling can result ranging from about 10 nm to about 13 nm, on average.

As mentioned, there is also white metal oxide pigment present that is coated with an alumina coating and dispersed with a polymeric dispersant. The "white" pigment provides much of the white coloration to the ink, though without the other ingredients in the ink, individual pigment particles may have some transparency or translucency. Examples of white metal oxide pigments that can be used include titanium dioxide particles, zinc oxide particles, zirconium oxide particles, combinations thereof, or the like. In one specific example, the white metal oxide pigment can be titanium dioxide ($TiO_2$), and even more specifically, rutile. Thus, the non-Newtonian white inks of the present disclosure are based on transparent metal oxide pigment particles with very high refractive index, that when spaced appropriately, provide very opaque and white print layers.

Pigments with high light scattering capabilities, such as these, can be selected to enhance light scattering and lower transmittance, thus increasing opacity. White metal oxide pigments can have a particulate size from about 100 nm to 2,000 nm, or from 150 nm to about 1,000 nm, or more typically, from about 150 nm to 750 nm, and in still another example, from about 180 nm to 400 nm. The combination of these pigments within these size ranges, appropriately spaced from one another with ingredients such as the alumina coating, amphoteric alumina particles, and latex particles, high opacity can be achieved at relatively thin thickness, e.g., 5 gsm to 60 gsm or 5 gsm to 50 gsm after removal of water and other solvent(s) from the printed ink and fixer film.

Regarding the alumina coating that can be applied to the white metal oxide pigment, any of a number of alumina compositions can be used. The alumina can be coated on the pigment by precipitation from a liquid phase, and in some examples, there are commercially available alumina-containing $TiO_2$ pigments (or other white metal oxide pigments) that can be used. These commercially available pigments which include alumina can be milled with polymeric dispersant, as described in greater detail hereinafter. Essentially, however, when alumina and white metal oxide pigment is co-milled with polymeric dispersant in an aqueous environment, a large number of gel-coat particles can be formed, similar to that shown in FIGS. 1C and 1D. As a side note, alumina coatings need not be only alumina. In some examples, alumina coatings can include other materials, such as silica.

The amount of free gel-coat particles produced in these dispersions during the milling process can be dependent on the original alumina content in the commercial pigment formulation. When the number of gel-coat particles is high enough, the gel-coat particles tend to compete with uncoated white metal oxide pigment particles for adsorption of the polymeric dispersant(s). Thus, a large number of individual alumina or gel-coat particles can use up enough of the dispersants from liquid phase to start destabilizing or flocculating the milled pigment particles. On the other hand, adsorption of anionic or weakly anionic dispersant molecules onto cationic alumina surface coated $TiO_2$ or other white metal oxide pigment particles may reduce overall surface charge pigment. As a result, in combination with the amphoteric alumina particles, the pigment particles may start forming weakly bound agglomerates (flocs) in the liquid phase of ink. Both phenomena usually manifests itself in increased milled slurry viscosity and its non-Newtonian (shear-thinning) rheological behavior. Thus, in accordance with examples of the present disclosure, to achieve the loose floc formation (or controlled destabilization) that is desirable, the alumina coated particle content and amphoteric alumina particle content can be included so as to be high enough to cause flocs to form when settling over time. White metal oxide pigment particles in higher gel-coat content dispersions agglomerate into loose flocs and tend to form voluminous sediments which can be redispersed easily by fluid agitation, which is desirable. To describe one specific example, the settling can form a semi-liquid yogurt-like consistency flocculated mass produced by settling of milled high gel-coat white metal oxide pigment and amphoteric alumina particles. For example, alumina-coated pigment Ti-Pure® R900 available from DuPont has an alumina content of about 4.3 wt % based on the pigment content, and thus, when milled with polymeric dispersant, can form the suspended flocs described herein, which are easily resuspended. Furthermore, the non-Newtonian character can be enhanced further by adding amphoteric alumina particles as described herein. Other alumina-coated pigments that can be used include, for example, TR® 50 (2.6 wt % alumina coating), TR® 52 (3.4 wt % alumina coating), TR60 (3.1 wt % alumina coating), TR® 90 (4 wt % alumina coating), and TR® 93 (3.9 wt % alumina coating), each from Huntsman Chemical; Ti-Pure® R960 (3.3 wt % alumina coating) and Ti-Pure® R931 (6.4 wt % alumina coating), each available from DuPont; and CR®-813 (3.5 wt % alumina coating) and CR®-828 (3.5 wt % alumina coating), each available from DuPont. Notably, these coating weight percentages are based on the pigment weight, and furthermore, silica may also be included with these coatings at various concentrations either greater than or less than the alumina content.

To provide some concentration ranges that are useful, raw $TiO_2$ pigment (or other white metal oxide pigment) coated with an alumina coating can be prepared with an alumina coating at a total amount of the gel-coat (either alumina alone or a combination of alumina and silica) on pigment surface at least at 0.1 wt % based on white metal oxide pigment weight, at least 0.5 wt % based on white metal oxide pigment weight, at least 2 wt % based on white metal oxide pigment weight, or at least 3 wt % based on white metal oxide pigment weight.

Alumina coated- and polymeric dispersant-modified white metal oxide pigments produced as described herein can be rendered or formulated into a non-Newtonian inkjet ink formulation with amphoteric alumina particles suitable for reliable printing through a thermal inkjet printhead or other printing system. During long-term inactivity of such white ink formulations, e.g. found in inkjet printhead and microfluidic channels as well as in ink supplies, the ink formulations can form pigment sediment. This settling can be remedied by short-term agitation and/or recirculation of the settled ink in the printhead, microfluidic channels, and ink supply of the printer, which easily recovers the ink to a properly working or jettable state.

The white metal oxide pigment with alumina coated thereon as part of a gel-coat, among other solids that may be present, i.e. the amphoteric alumina particles, can be dispersed by milling the components together. Typically, the alumina coating on the metal oxide pigment is co-milled with the polymeric dispersant, and the amphoteric alumina particles are added afterwards in the ink formulation, but in some examples, the amphoteric alumina particles can be added before or during milling.

Regarding the polymeric dispersants per se, any of a number of polymeric dispersants can be used. For example, a short-chain anionic dispersant can be used, a non-ionic or predominantly non-ionic dispersing agent, and/or any other dispersant effective for dispersing the white metal oxide pigment. Suitable dispersing agents can allow for dispersibility and stability in an aqueous ink environment, as well as for contributing to controlled destabilizing effect (along with the alumina coating) when the white metal oxide pigment settles and forms a white flocculated colorant mass. These dispersants can also be prepared to have little to no impact on the viscosity of the liquid phase of the ink, as well as retain good printhead reliability in thermal inkjet printheads (if the ink is a thermal inkjet ink). If the ink is a piezo inkjet ink, then additional flexibility regarding viscosity is tolerable. Dispersant of one or various types can each be present in the inks of the present disclosure at various concentrations, such as from 0.005 wt % to 5 wt %.

For definitional purposes, "short-chain anionic dispersants" that can be used include polymeric dispersants with chain length short enough to impact viscosity of ink formulation at moderate concentrations, typically having an acid number higher than 100 mg KOH/g based in dry polymer content. For example, short-chain anionic dispersants can include dispersants having a weight average molecular weight lower than 30,000 Mw, or more typically, lower than 15,000 Mw, e.g., 1,000 Mw to 30,000 Mw, or from 2,000 Mw to 15,000 Mw.

Also for definitional purposes, "non-ionic or predominantly non-ionic dispersants" include non-ionic dispersants, as well as only weakly ionic dispersants, i.e. the acid number of the non-ionic or predominantly non-ionic/weak anionic dispersant, per dry polymer, is typically not higher than 100 mg KOH/g, and is typically not higher than 50 mg KOH/g, or even not higher than 30 mg KOH/g. That being stated, in one example, non-ionic dispersing agent with no anionic properties can be used. These non-ionic or predominantly non-ionic dispersants can range in average molecular weight from 500 Mw to 50,000 Mw, in certain examples.

Turning now to the short-chain anionic dispersants, examples include polymers and/or oligomers with low weight average molecular weight. More specifically, low molecular weight (Mw) short-chain anionic dispersants can include acrylic and methacrylic acids homopolymers such as polyacrylic acid (PAA), polymethacrylic acid (PMAA), or their salts. More specific examples include, but are not limited to, Carbosperse® K-7028 (PAA with M~2,300), Carbosperse® K-752 (PAA with M~2,000), Carbosperse® K-7058 (PAA with M~7,300), Carbosperse® K-732 (PAA with M~6,000), Carbosperse® K-752 (Na salt of PMAA with M~5,000), all available from Lubrizol Corporation. Others include Dispex® AA 4935 available from BASF Dispersions & Pigments Division, as well as Tamol® 945 available from Dow Chemical. Low molecular weight acrylic and methacrylic acid co-polymers with other carboxylic monomer moieties can also be used, such as co-polymers of acrylic and maleic acids available from Kelien Water Purification Technology Co. Low molecular weight co-polymers of carboxylic acid monomers with other water-soluble non-carboxylic acidic monomer moieties, such as sulfonates, styrenesulfonates, phosphates, etc., can also be used. Examples of such dispersants include, but are not limited to, Carbosperse® K-775 and Carbosperse® K-776 (co-polymers of acrylic and sulfonic acid), Carbosperse® K-797, Carbosperse® K-798, or Carbosperse® K-781 (co-polymers of acrylic, sulfonic acid and styrenesulfonic acid), all available from Lubrizol Corporation. Additionally, low molecular weight co-polymers of carboxylic acid monomers with some hydrophobic monomers can likewise be used. Dispersants from this group are suitable here if their acid number (content of hydrophilic acidic moieties in polymer chain) is high enough to make the dispersant well soluble in aqueous phase. Examples of such dispersants include, but are not limited to styrene-acrylic acid copolymers such as Joncryl® 671, Joncryl® 683, Joncryl® 296, or Joncryl® 690, available from BASF, as well as other water soluble styrene-maleic anhydride co-polymer resins.

Referring now to the non-ionic dispersants that can be used, examples include water-hydrolysable silane coupling agents (SCAs) with relatively short (oligomer length range of not longer than 50 units, not longer than 30 units, or not longer than 15 units, e.g., 10 to 15 units) polyether chain(s), which are also soluble in water. An example of such a dispersant includes Silquest® A1230 polyethylene glycol methoxysilane available from Momentive Performance Materials. Other examples include soluble low-to-midrange M (e.g., usually molecular mass of the polymer less than 15,000 Da) branched co-polymers of comb-type structures with polyether pendant chains and acidic anchor groups attached to the backbone, such as Disperbyk® 190 and Disperbyk® 199 available from BYK Chemie, as well as Dispersogen® PCE available from Clariant. In one example, one or both of Cab-O-Sperse® K-7028 and Disperbyk® 190 can be used.

In one example, reactive hydrophilic alkoxysilane dispersants that can be present, and examples include, but are not limited to, hydrolysable alkoxysilanes with alkoxy group attached to water-soluble (hydrophilic) moieties, such as water-soluble polyether oligomer chains, phosphate groups, or carboxylic groups. In some examples, the dispersant used to disperse the alumina coated white metal oxide pigment can be a polyether alkoxysilane or polyether phosphate dispersant. Upon dissolution in water with the alumina and the white metal oxide pigment, the alkoxysilane group of the dispersant often hydrolysis resulting in formation of silanol group. The silanol group, in turn, may react or form hydrogen bonds with hydroxyl groups of metal oxide particulate surface, as well as with silanol groups of other dispersant molecules through hydrogen bonding. These reactions lead to bonding or preferential absorption of the dispersant molecules to the metal oxide particulate surfaces and also form bonds between dispersant molecules themselves. As a result, these interactions can form thick hydrophilic coatings of reactive dispersant molecules on surface of the alumina coated white metal oxide pigment. This coating can increase the hydrodynamic radius of the particles and thus reduce their effective density and settling rate. Furthermore, the dispersant coating and the amphoteric alumina particles prevent agglomeration of the alumina coated white metal oxide pigment upon settling so that when sediment and settling does occur over time in the ink formulations, the settled pigment and other particles remain fluffy and thus are easy to redisperse upon agitation. In still further detail, these dispersants have a relatively short chain length and do not contribute significantly to the ink viscosity, even with relatively high metal oxide particulate loads, e.g. over 25 wt % white metal oxide pigment in the ink.

As mentioned, a suitable alkoxysilane dispersant can have an alkoxysilane group which can be easily hydrolyzed in aqueous environment and produce a silanol group, and a hydrophilic segment. The general structure of the alkoxysilane group is —$Si(OR)_3$, where R most can be methyl, ethyl, n-propyl, isopropyl, or even a longer (branched or unbranched) alkane chain. It is noted that the longer the hydrocarbon (R), the slower hydrolysis rate and rate of interaction with dispersed metal oxide particulate surface. In a few highly practical examples, structures with —$Si(OR)_3$ where R is methyl or ethyl can typically be used. The hydrophilic segment of the alkoxysilane dispersant can likewise be large enough (relative to the whole molecule size) in order to enable dispersant solubility in aqueous environment, as well as prevent agglomeration of the alumina coated white metal oxide pigment and amphoteric alumina particles. In one example, the hydrophilic segment can be a polyether chain, e.g., polyethylene glycol (PEG) or its co-polymer with polypropylene glycol (PPG). Polyether-based dispersant moieties have clean thermal decomposition, and thus, are good candidates for use. When heated above decomposition temperature, PEG and PPG-based molecules decompose into smaller molecular fragments with high volatility or good water solubility. Thus, their decomposition usually does not form noticeable amounts of solid residue on surface of microscopic heaters used for driving thermal inkjet printheads (which can cause thermal inkjet printheads to fail over time or render them non-operational in some instances).

In further detail, examples polyether alkoxysilane dispersants that may be used to disperse alumina coated white metal oxide pigment can be represented by the following general Formula (I):

wherein:
a) $R^1$, $R^2$ and $R^3$ are hydroxy groups, or hydrolyzable linear or branched alkoxy groups. For hydrolyzable alkoxy groups, such groups can have 1 to 3 carbon atoms; in one aspect, such groups can be —$OCH_3$ and —$OCH_2CH_3$. In some examples, $R^1$, $R^2$ and $R^3$ are linear alkoxy groups having from 1 to 5 carbon atoms. In some other examples, $R^1$, $R^2$ and $R^3$ groups are —$OCH_3$ or —$OC_2H_5$.
b) PE is a polyether oligomer chain segment of the structural formula $[(CH_2)_n$—CH(R)—O$]_m$, attached to Si through Si—C bond, wherein n is an integer ranging from 0 to 3, wherein m is an integer superior or equal to 2 and wherein R is H or a chain alkyl group. R can also be a chain alkyl group having 1 to 3 carbon atoms, such as $CH_3$ or $C_2H_5$. In some examples, m is an integer ranging from 3 to 30 and, in some other examples, m is an integer ranging from 5 to 15. The polyether chain segment (PE) may include repeating units of polyethylene glycol (PEG) chain segment (—$CH_2CH_2$—O—), or polypropylene glycol (PPG) chain segment (—$CH_2$—CH($CH_3$)—O—), or a mixture of both types. In some examples, the polyether chain segment (PE) contains PEG units (—$CH_2CH_2$—O—); and
c) $R^4$ is hydrogen, or a linear or a branched alkyl group. In some examples, $R^4$ is an alkyl group having from 1 to 5 carbon atoms.

Other examples of dispersants used to disperse alumina coated white metal oxide pigment can include polyether alkoxysilane dispersants having the following general Formula (II):

wherein R', R" and R''' are linear or branched alkyl groups. In some examples, R', R" and R''' are linear alkyl groups having from 1 to 3 carbon atoms in chain length. In some examples, R', R" and R'''—$CH_3$ or —$C_2H_5$. $R^4$ and PE are as described above for Formula (I); i.e. PE is a polyether oligomer chain segment of the structural formula: $[(CH_2)_n$—CH—R—O$]_m$, wherein n is an integer ranging from 0 to 3, wherein m is an integer superior or equal to 2 and wherein R is H or a chain alkyl group; and $R^4$ is hydrogen, or a linear or a branched alkyl group. In some examples, $R^4$ is $CH_3$ or $C_2H_5$.

In some examples, the alumina coated white metal oxide pigment present in the ink compositions are dispersed with polyether alkoxysilanes. Examples of suitable polyether alkoxysilanes include $(CH_3O)_3Si$—$(CH_2CH_2O)_{n'}$, H; $(CH_3CH_2O)_3Si$—$(CH_2CH_2O)_{n'}$, H; $(CH_3O)_3Si$—$(CH_2CH_2O)_{n'}$, $CH_3$; $(CH_3CH_2O)_3Si$—$(CH_2CH_2O)_{n'}$, $CH_3$; $(CH_3O)_3Si$—$(CH_2CH_2O)_{n'}$, $CH_2CH_3$; $(CH_3CH_2O)_3Si$—$(CH_2CH_2O)_{n'}$, $CH_2CH_3$; $(CH_3O)_3Si$—$(CH_2CH(CH_3)O)_{n'}$, H; $(CH_3CH_2O)_3Si$—$(CH_2CH(CH_3)O)_{n'}$, H; $(CH_3O)_3Si$—$(CH_2CH(CH_3)O)_{n'}$, $CH_3$; $(CH_3CH_2O)_3Si$—$(CH_2CH(CH_3)O)_{n'}$, $CH_3$; wherein n' is an integer equal to 2 or greater. In some examples, n' is an integer ranging from 2 to 30 and, in some other examples, n' is an integer ranging from 5 to 15.

Commercial examples of the polyether alkoxysilane dispersants include, but are not limited to, the aforementioned Silquest® A-1230 manufactured by Momentive Performance Materials, and Dynasylan® 4144 manufactured by Evonik/Degussa.

The amount of dispersant used to disperse the alumina coated white metal oxide pigment and other solids may vary from about 0.3% by weight to about 300% by weight of the white metal oxide pigment content. In some examples, the dispersant content range is from about 0.5 to about 150% by weight of the white metal oxide pigment content. In some other examples, the dispersant content range is from about 5 to about 100% by weight of the white metal oxide pigment content.

A dispersion of white metal oxide pigment suitable for forming the non-Newtonian white inks of the present disclosure can be prepared via milling or dispersing metal oxide powder in water in the presence of suitable dispersants and alumina. For example, the metal oxide dispersion may be prepared by milling commercially available inorganic oxide pigment with alumina coating (having a large particulate size, e.g., even in the micron range) in the presence of a polymeric dispersant, or by milling of white oxide pigment coated with alumina-rich gel-coat, until the desired particulate size is achieved. The starting dispersion to be milled can be an aqueous dispersion with solid content up to 65% by weight of the white metal oxide pigment. The milling equipment that can be used may be a bead mill, which is a wet grinding machine capable of using very fine beads having diameters of less than 1.0 mm (and, generally, less than 0.5 mm) as the grinding medium, for example, Ultra-Apex Bead Mills from Kotobuki Industries Co. Ltd, or MiniCer® bead mill (available from NETZSCH Premier Technologies, LLC, Exton, Pa.). The milling duration, rotor speed, and/or temperature may be adjusted to achieve the dispersion particulate size desired. In one example, the polymeric dispersant can include a short-chain anionic dispersant or a non-ionic or predominantly non-ionic dispersant, or both. Thus, the polymeric dispersant can be co-milled with the alumina-coated white metal oxide pigment, thereby modifying both the surface of white metal oxide pigment and physical character of the alumina (creating a coating of alumina on the reduced size white metal oxide pigment). The freshly milled surface and coating can thus be highly accepting of the polymeric dispersant.

It is also notable that there can be some advantages to adding the latex particles to the inks of the present disclosure. For example, by combining the modified white metal oxide pigment (modified by alumina coating and polymeric dispersant) with latex particles, opacity can be increased further. In one aspect, a white metal oxide pigment to latex particulate weight ratio can be from 6:1 to 1:3. In certain specific examples, by selecting white metal oxide pigment with a high refractive index (e.g. from 1.8 to 2.8), and latex particles with a relatively lower refractive index (e.g., from 1.3 to 1.6), the opacity of the ink when printed on a media sheet can be unexpectedly increased further compared to an ink without the added latex particles.

Furthermore, the latex particles (at high enough concentration) can form continuous polymer phase after the ink printing and drying/curing. This polymer phase can bind rigid particles into continuous coating with good mechanical durability, i.e. act as a binder phase. In the absence of the binder in these ink formulations, the printed layer would may not have as much mechanical durability (reduced rub resistance, etc.). In one example, a latex dispersion may be produced by emulsion polymerization or co-polymerization of acrylic and styrene monomers. The list of suitable monomers can include (but is not limited to) C1 to C8 alkyl methacrylates and alkyl acrylates, styrene and substituted methyl styrenes, polyol acrylates and methacrylates such as hydroxyethyl acrylate, acrylic acid, methacrylic acid, polymerizable surfactants, or the like.

The monomers used in the latexes can also be vinyl monomers. In one example, the monomers can be vinyl monomers (such as vinyl chloride, vinylidene chloride, etc.), vinyl ester monomers, acrylate monomers, methacrylate monomers, styrene monomers, ethylene, maleate esters, fumarate esters, itaconate esters, or mixtures thereof. In one aspect, the monomers can include acrylates, methacrylates, styrenes, or mixtures thereof. The monomers can likewise include hydrophilic monomers including acid monomers as mentioned, as well as hydrophobic monomers. Furthermore, monomers that can be polymerized in forming the latexes include, without limitation (some of which being previously mentioned), styrene, α-methyl styrene, p-methyl styrene, methyl methacrylate, hexyl acrylate, hexyl methacrylate, butyl acrylate, butyl methacrylate, ethyl acrylate, ethyl methacrylate, propyl acrylate, propyl methacrylate, 2-ethylhexyl acrylate, 2-ethylhexyl methacrylate, octadecyl acrylate, octadecyl methacrylate, stearyl methacrylate, vinylbenzyl chloride, isobornyl acrylate, tetrahydrofurfuryl acrylate, 2-phenoxyethyl methacrylate, benzyl methacrylate, benzyl acrylate, ethoxylated nonyl phenol methacrylate, isobornyl methacrylate, cyclohexyl methacrylate, trimethyl cyclohexyl methacrylate, t-butyl methacrylate, n-octyl methacrylate, lauryl methacrylate, trydecyl methacrylate, alkoxylated tetrahydrofurfuryl acrylate, isodecyl acrylate, isobornylmethacrylate, isobornyl acrylate, dimethyl maleate, dioctyl maleate, acetoacetoxyethyl methacrylate, diacetone acrylamide, N-vinyl imidazole, N-vinylcarbazole, N-vinyl-caprolactam, combinations thereof, derivatives thereof, or mixtures thereof.

Acidic monomers that can be polymerized in forming latexes include, without limitation, acrylic acid, methacrylic acid, ethacrylic acid, dimethylacrylic acid, maleic anhydride, maleic acid, vinylsulfonate, cyanoacrylic acid, vinylacetic acid, allylacetic acid, ethylidineacetic acid, propylidineacetic acid, crotonoic acid, fumaric acid, itaconic acid, sorbic acid, angelic acid, cinnamic acid, styrylacrylic acid, citraconic acid, glutaconic acid, aconitic acid, phenylacrylic acid, acryloxypropionic acid, aconitic acid, phenylacrylic acid, acryloxypropionic acid, vinylbenzoic acid, N-vinylsuccinamidic acid, mesaconic acid, methacroylalanine, acryloylhydroxyglycine, sulfoethyl methacrylic acid, sulfopropyl acrylic acid, styrene sulfonic acid, sulfoethylacrylic acid, 2-methacryloyloxymethane-1-sulfonic acid, 3-methacryoyloxypropane-1-sulfonic acid, 3-(vinyloxy)propane-1-sulfonic acid, ethylenesulfonic acid, vinyl sulfuric acid, 4-vinylphenyl sulfuric acid, ethylene phosphonic acid, vinyl phosphoric acid, vinyl benzoic acid, 2-acrylamido-2-methyl-1-propanesulfonic acid, combinations thereof, derivatives thereof, or mixtures thereof.

In one specific example, the acidic monomer content in the latex mix can range from 0.1 wt % to 15 wt % and the balance being non-acidic monomers, with suitable latex particle sizes range from 50 nm to 300 nm. Glass transition temperatures may range from −20° C. to 130° C. The latex content in the non-Newtonian white ink formulations, when present, may range from 2 wt % to 30 wt %, or from 3 wt % to 20 wt %, or more typically from 5 wt % to 15 wt %.

As mentioned, the particulate size of the white metal oxide pigment can be from 100 nm to 1,000 nm, but in other examples, the particulate size can be from 125 nm to 700 nm, from 150 nm to 500 nm, or 180 nm to 400 nm. These larger sized particles are considered to be efficient particulate sizes for light scattering when spaced appropriately by the alumina coating, amphoteric alumina particles, and the latex particles. The more efficient the light scattering, typically, the more opaque the printed ink layer may be (assuming appropriate spacing in the pigmented layer as described herein). Thus, the non-Newtonian white inks of the present disclosure can be formulated such that when printed, the alumina coating, amphoteric alumina particles, and latex particles provide an average space between white metal oxide pigment ranging from 20 nm to 1,000 nm, in one example. In other examples, the average space between white metal oxide pigment can be 50 nm to 500 nm, from 50 to 300, or in one specific example, about 50 nm to 250 nm.

In further detail, optical spacing can be experimentally evaluated by printing the ink on a media substrate, and when a latex is present, fusing the ink by applying heat at a temperature about 2° C. to 110° C. above the minimum film formation temperature of the latex particles, and evaluating using Transition Electron Microscopy (TEM) cross-section photo of a printed white ink layer after drying. If the opacity provided by the non-Newtonian white ink is not high enough, the ratio of white metal oxide pigment to latex particles can be adjusted up or down, as effective, or the thickness of the ink can be increased. That being stated, an advantage of the non-Newtonian white inks of the present disclosure is that in some instances, thickness does not need to be increased to increase opacity. For example, by appropriately spacing the white metal oxide pigment and latex particles, opacity can be boosted from 0.1% to 25%, and more typically, from 5% to 25%.

In addition to assisting with enhanced opacity, as briefly mentioned, the latex particles can also provide enhanced durability. More specifically, the use of latex particles, including fusible latex particles that are thermally or otherwise cured after printing on the media substrate, can provide added durability to the printed image. Thus, the latex can provide the dual role of assisting the alumina coating in enhancing opacity by appropriately spacing the white metal oxide pigment, and can also provide durability on the printed media sheet. This is particularly the case in examples where there may be high metal oxide particulate loads that are dispersed by appropriate dispersing agents. Films formed by hard ceramic particles such as high refractive index metal oxides on surface of low porosity and non-porous media substrates tend to have very poor mechanical properties. The film-forming behavior of latex particles described herein can bind the relatively large white metal oxide pigment (with dispersing agent present in the ink) into continuous coating that can be very durable. Additionally, as mentioned, the low refractive index of the polymer film along with the alumina coating creates low refractive index or "n" domains, i.e. optical spacers between high n white metal oxide pigment particles, thereby enhancing opacity of the print.

Coalescence of latex particles into continuous phase creates low refractive index domains in the coating. The refractive index of the fused latex in the coating may range from 1.3 to 1.65, and in one example, can be from 1.4 to 1.6, or 1.4 to 1.5. That, in conjunction with the alumina (or alumina and silica) coating with a refractive index ranging from 1.4 to 1.65 is contrasted with the white metal oxide pigment particles which have a refractive index ranging from 1.8 to 2.8, or from 2.2 to 2.8. Specific examples include zinc oxide (about 2.4), titanium dioxide (about 2.5 to 2.7), zirconium oxide (about 2.4), etc. Typically, the difference in the refractive indexes can be from about 0.2 to 1.5, or more, if possible (typically, the higher is the better), though this is not always the case, as long as there is enough of a difference that the opacity can be increased at least to some degree by the optical spacing and the refractive index difference.

The latexes can have various shapes, sizes, and molecular weights. In one example, polymer in the latex particles may have a weight average molecular weight (Mw) of about 5,000 Mw to about 500,000 Mw. In one aspect, the latex particles can have a weight average molecular weight (Mw) ranging from about 100,000 Mw to about 500,000 Mw. In some other examples, the latex resin has a weight average molecular weight of about 150,000 Mw to 300,000 Mw.

The non-Newtonian white inks described herein are very useful for inkjet application, including thermal inkjet application. In one example, a reactive hydrophilic alkoxysilane dispersant can be used to assist in particulate dispersion and jettability. These or other dispersants can be short-chain anionic, or non-ionic or predominantly non-ionic in nature. In some specific examples, inkjet printing of white coatings or patterns with adequate opacity (>50-60%) can benefit from a relatively high pigment load (e.g. white metal oxide pigment above 2 wt %, above 5 wt %, above 8 wt %, etc.). Jetting of high pigment load (particularly with other solids) inks becomes challenging even for piezo printheads. However, with the use of an appropriate dispersant, such as the non-ionic or predominantly non-ionic dispersants described herein, more reliable performance of higher metal oxide particulate loads printed from thermal inkjet printheads with low nominal drop weight (as low as 10 ng, or even as low as 5 ng) can be realized.

Turning now to the fixer fluid that may be used with the non-Newtonian white inks of the present disclosure, cationic polymer can be added to various ink or liquid vehicles to form fixer fluids of various viscosities for various application processes. Cationic polymers that may be used can include guanidinium or fully quaternized ammonium functionalities, such as quaternized polyamine copolymers. In one example, the cationic polymer might not contain primary or secondary ammonium functionalities, such as polyallylamine or polyethylene imine. Generally, for some digital application processes, i.e. thermal inkjet application, the weight average molecular weight (Mw) of the cationic polymer allows viscosity of 1 cP to 25 cP at 25° C., 1 cP to 15 cP at 25° C., or 1 cP to 10 cP at 25° C., as measured on a Brookfield viscometer. Though viscosity outside of this range can be used, particularly for piezo inkjet applications or for analog (non-digital printing) applications, e.g., 1 cP to 35 cP at 25° C. (for piezo inkjet) and 1 cP to 500 cP at 25° C. for analog applications. Typical weight average molecular weight for the cationic polymer can be less than 500,000 Mw, and in one aspect, less than 50,000 Mw. In another example, cationic polymers can have high charge densities to enhance fixing efficiencies. As such, cationic charge densities can be higher than 1000 microequivalents per gram cationic functionality. In one aspect, higher than 4000 microequivalents per gram can be used. Additionally, concentrations can be low to avoid regulatory issues with aquatic toxicity, e.g., from 0.1 wt % to 25 wt %, and in one aspect, 1 wt % to 5 wt %, or in another aspect, from 1 wt % to 2.5 wt %.

In additional detail, classes of cationic polymers that can be used include, but are not limited to, quaternized polyamines, dicyandiamide polycations, diallyldimethyl ammonium chloride copolymers, quaternized dimethylaminoethyl(meth)acrylate polymers, quaternized vinylimidizol polymers, alkyl guanidine polymers, alkoxylated polyethylene imines, and mixtures thereof. It is to be understood that one or multiple polycations may be used, and that any desirable combination of the polycations can be used. One or multiple ions of the cationic polyelectrolytes may be ion-exchanged for a nitrate, acetate, mesylate, or other ion. As a non-limiting example, one material is Floquat® FL2350, a quaternized polyamine derived from epichlorohydrin and dimethyl amine, commercially available from SNF Inc.

Typical ink vehicle or fixer vehicle formulations described herein can include water and other ingredients, depending on the application method desired for use. For example, when jetting the ink or fixer, the formulation may include water as well as co-solvents present in total at from 0.1 wt % to 50 wt %, though amounts outside of this range can also be used. Further, surfactants can be present, ranging from 0.01 wt % to 10 wt %. The balance of the formulation can further include or other vehicle components known in the art, such as biocides, viscosity modifiers, materials for pH adjustment, sequestering agents, preservatives, and the like. Typically, the ink vehicle can include water as one of a major solvent and can be referred to as an aqueous liquid vehicle. It is noted that the fixer fluid may be formulated for inkjet application or for analog coating processes, and thus, the ingredients and concentrations for such different applications can vary widely. For example, a thicker slurry may be used for analog application, or a less viscous fluid may be used for digital application.

Apart from water, the ink vehicle can include high boiling solvents and/or humectants such as aliphatic alcohols, aromatic alcohols, diols, glycol ethers, polyglycol ethers, 2-pyrrolidinones, caprolactams, formamides, acetamides, and long chain alcohols. Examples of such compounds include but are not limited to 2-pyrrolidinone and 2-methyl-1,3-propanediol. The concentration range for high boiling solvents and/or humectants in the ink can be from 0.1 wt % to 30 wt %, depending on the printhead jetting architecture, though amounts outside of this range can also be used.

Classes of co-solvents that can be used can include organic co-solvents including aliphatic alcohols, aromatic alcohols, diols, glycol ethers, polyglycol ethers, 2-pyrrolidinones, caprolactams, formamides, acetamides, and long chain alcohols. Examples of such compounds include primary aliphatic alcohols, secondary aliphatic alcohols, 1,2-alcohols, 1,3-alcohols, 1,5-alcohols, ethylene glycol alkyl ethers, propylene glycol alkyl ethers, higher homologs ($C_6$-$C_{12}$) of polyethylene glycol alkyl ethers, N-alkyl caprolactams, unsubstituted caprolactams, both substituted and unsubstituted formamides, both substituted and unsubstituted acetamides, and the like.

Consistent with the formulation of this disclosure, various other additives may be employed to enhance the properties of the ink composition for specific applications. Examples of these additives are those added to inhibit the growth of harmful microorganisms. These additives may be biocides, fungicides, and other microbial agents, which are routinely used in ink formulations. Examples of suitable microbial agents include, but are not limited to, NUOSEPT® (Nudex, Inc.), UCARCIDE™ (Union carbide Corp.), VANCIDE® (R.T. Vanderbilt Co.), PROXEL® (ICI America), and combinations thereof.

Sequestering agents, such as EDTA (ethylene diamine tetra acetic acid), may be included to eliminate the deleterious effects of heavy metal impurities, and buffer solutions may be used to control the pH of the ink. From 0.01 wt % to 2 wt %, for example, can be used. Viscosity modifiers and buffers may also be present, and/or other additives to modify properties of the ink as desired. Such additives can be present at from 0.01 wt % to 20 wt %.

Figure 6:
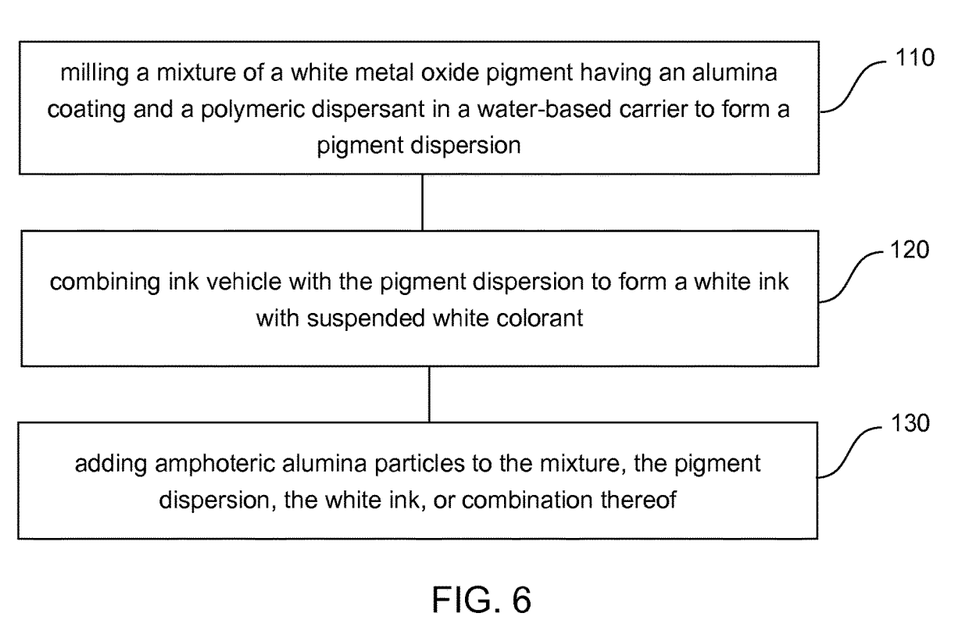
FIG. 6 is a flow chart describing a method of making a non-Newtonian white ink in accordance with examples of the present disclosure.

The non-Newtonian white inks of the present disclosure can be made by various methods. However, in one example, a method of making non-Newtonian white inks is shown and described in FIG. 6, which provides a flow chart depicting such a method. This method can include milling 110 a mixture of a white metal oxide pigment having an alumina coating and a polymeric dispersant in a water-based carrier to form a pigment dispersion; combining 120 ink vehicle with the pigment dispersion to form a white ink with suspended white colorant; and adding 130 amphoteric alumina particles to the mixture, the pigment dispersion, the white ink, or combination thereof.

It is noted that when discussing the present inks and/or methods, each of these discussions can be considered applicable to each of these examples, whether or not they are explicitly discussed in the context of that example. Thus, for example, in discussing refractive index related to a composition or the opacity in the context of the non-Newtonian white ink, such elements are also relevant to and directly supported in the context of the methods described herein, and vice versa.

It is to be understood that this disclosure is not limited to the particular processes and materials disclosed herein because such processes and materials may vary somewhat. It is also to be understood that the terminology used herein is used for the purpose of describing particular examples only. The terms are not intended to be limiting because the scope of the present disclosure is intended to be limited only by the appended claims and equivalents thereof.

It is be noted that, as used in this specification and the appended claims, the singular forms "a," "an," and "the" include plural referents unless the context clearly dictates otherwise.

The term "white metal oxide pigment" refers to pigments that impart a white color to a ink, but may in fact be essentially colorless pigments with a high refractive index, e.g., greater than 1.6 or greater than 1.8. For Example, titanium dioxide ($TiO_2$) is an example of such a pigment that imparts white color to an ink, but when viewed on a particle by particle basis, can appear colorless.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary.

Furthermore, it is understood that any reference to open ended transition phrases such "comprising" or "including" directly supports the use of other known, less open ended, transition phrases such as "consisting of" or "consisting essentially of" and vice versa.

Concentrations, amounts, and other numerical data may be expressed or presented herein in a range format. It is to be understood that such a range format is used merely for convenience and brevity and thus should be interpreted flexibly to include not only the numerical values explicitly recited as the limits of the range, but also to include all the individual numerical values or sub-ranges encompassed within that range as if each numerical value and sub-range is explicitly recited. As an illustration, a numerical range of "about 1 to about 5" should be interpreted to include not only the explicitly recited values of about 1 to about 5, but also include individual values and sub-ranges within the indicated range. Thus, included in this numerical range are individual values such as 2, 3, and 4 and sub-ranges such as from 1-3, from 2-4, and from 3-5, etc. Additionally, a numerical range with a lower end of "0" can include a sub-range using "0.1" as the lower end point.

EXAMPLES

The following illustrates some examples of the disclosed inks, methods, and fluid sets that are presently known. However, it is to be understood that the following are only illustrative of the application of the principles of the present disclosure. Numerous modifications and alternative examples may be devised without departing from the spirit and scope of the present compositions and methods. Thus, while the present inks, methods, and fluid sets have been described above with particularity, the following examples provide further detail in connection with what are presently deemed to be some of the acceptable examples.

Example 1

Figure 7:
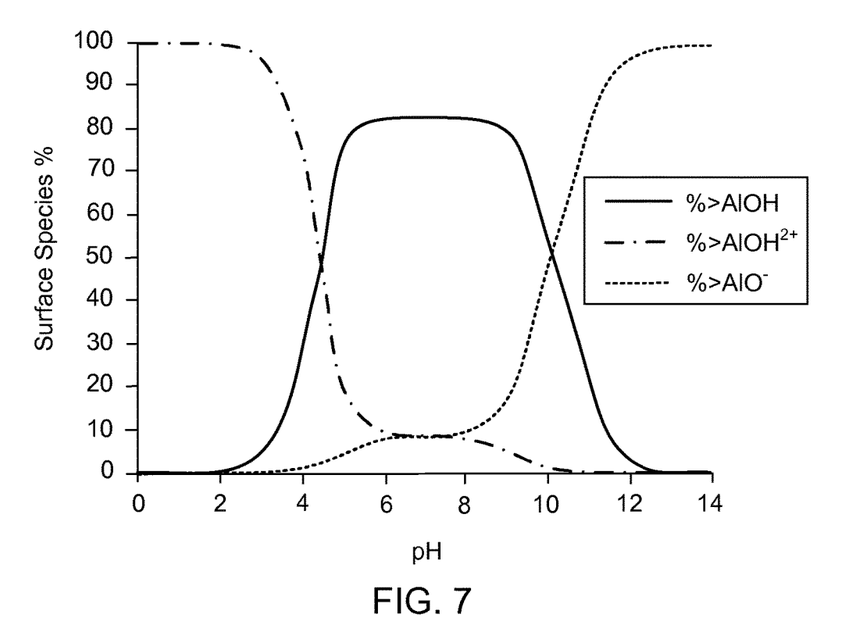
FIG. 7 is a graph depicting the effect pH has on alumina in accordance with examples of the present disclosure.

Concentrations of positively charged cationic sites on alumina surface can be controlled by pH. FIG. 7 shows the impact of pH on populations of charged species on the surface of alumina exposed to aqueous environment (exposed to aqueous environment at mildly acidic or neutral pH range). Thus, electrostatic attraction of polymeric dispersants having negatively charged anionic anchoring groups can be controlled through controlling the pH of the cationic alumina surface. Furthermore, the amphoteric alumina particles also be similarly impacted.

Example 2

As a general example, a non-Newtonian white metal oxide dispersion with good sediment redispersibility is prepared by milling base alumina-coated $TiO_2$ pigment powder in a water-based slurry containing about 20-70 wt % of the pigment, 0.5 wt % to 4 wt % (by dry pigment weight) polymeric non-ionic or predominantly non-non-ionic dispersant, and 0 to 1 wt % (or 0.1 wt % to 1 wt %) anionic polymeric dispersant content is between 0.1 and 1% (by dry pigment weight). Milling can continue until a mean pigment particle size reaches an appropriate size for light-scattering in a given formulation.

The non-Newtonian white metal oxide dispersion can then be formulated into a non-Newtonian white ink by adding additional ink vehicle components, such as additional water, organic solvent, surfactant, etc. Solids can be likewise added, such as latex particles and amphoteric alumina particles as described herein. The amphoteric alumina particles can have a smaller average size than the pigments, and can be added at a concentration with the concentration of the white pigment to generate a non- Newtonian or shear thinning white ink. By adding amphoteric alumina particles, lower concentrations of the pigment may be added and still achieve a non-Newtonian white ink.

Example 3

A slurry was milled that contained TiO₂ pigment powder with an alumina and silica coating (Ti-Pure® R706 available from DuPont) at 51.5 wt %, 0.3 wt % (per dry pigment weight) of a low M weight anionic polyacrylic acid (Carbosperse® K-7028 available from Lubrizol Corporation), and 0.8 wt % (per dry pigment weight) of a predominantly non-ionic polymeric dispersant with anionic anchoring groups (Disperbyk®-190 available from BYK Chemie). The milling was carried out in a MiniCer® bead mill available from NETZSCH Premier Technologies, LLC., Exton, Pa., utilizing YTZ milling beads with 0.3 mm diameter. The milling duration was about 120 minutes. The mean particle size of the TiO₂ in the milled dispersion was about 230 nm (as determined by NANOTRACK® particle size analyzer, Microtrac Corp., Montgomeryville, Pa.). To a first Control Dispersion, nothing further was added. To a second Example Dispersion, 2 wt % (based on dry pigment weight) of boehmite amphoteric alumina particles (10 nm to 13 nm average particle size) were added.

Figure 8:
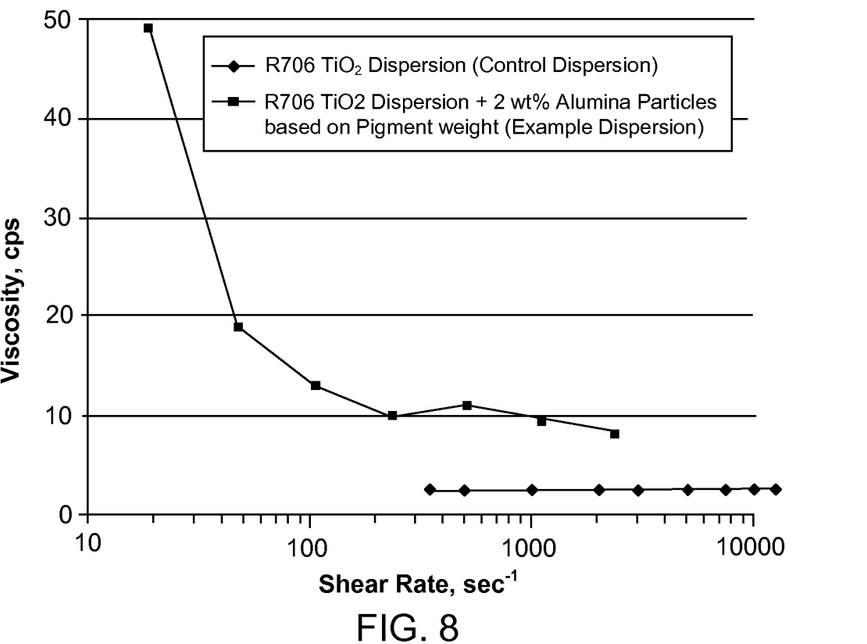
FIG. 8 is a graph depicting the non-Newtonian nature of white pigment dispersions prepared in accordance with examples of the present disclosure.

Rheology profiles were generated for each dispersion using an m-VROC capillary viscometer available from Rheosense, Inc. As shown in FIG. 8, even though both pigments had an alumina and silica gel-sol coating, the Control Dispersion did not exhibit non-Newtonian properties, whereas only 2 wt % (based on pigment weight) of amphoteric alumina particles added to the dispersion generated an ink with significant non-Newtonian, shear thinning, properties, i.e. about 5× change from 10 sec$^{-1}$ to 1000 sec$^{-1}$.

Example 4

Four white inks were prepared to evaluate non-Newtonian and colorant settling properties. The four inks prepared included were Ti-Pure® R706 available from DuPont dispersed by a common polymeric dispersant package and suspended in an ink vehicle. Specifically, the white inks prepared were: Control White Ink (without added amphoteric alumina particles), Example White Ink 1 (with 0.5 wt % added amphoteric alumina particles based on pigment weight), Example White Ink 2 (with 1 wt % added amphoteric alumina particles based on pigment weight), and Example Ink 3 (with 2 wt % added amphoteric alumina particles based on pigment weight). The respective formulations are shown in Table 1, below:

TABLE 1

| Components | Control Ink (wt %) | Example Ink 1 (wt %) | Example Ink 2 (wt %) | Example Ink 3 (wt %) |
|---|---|---|---|---|
| 2-methyl-1,3-propanediol | 9 | 9 | 9 | 9 |
| 2-Pyrrolidinone | 16 | 16 | 16 | 16 |
| ¹Tergitol ® 15-S-7 | 1 | 1 | 1 | 1 |
| ²Capstone ® FS-35 | 1.98 | 1.98 | 1.98 | 1.98 |
| ¹Tergitol ® TMN-6 | 1 | 1 | 1 | 1 |
| Acrylic binder latex (41.4 wt % polymer solids) | 21.74 | 21.74 | 21.74 | 21.74 |
| ³Disperal ® Alumina Dispersion (Boehmite Particle Size 10 nm to 13 nm - 19 wt % solids) | — | 2.63 | 5.26 | 10.53 |
| ²Ti-Pure ® R706 TiO₂ (51.8 wt % solids) dispersed with Carbosperse ® K-7028 (0.5 wt %) and Disperbyk ®-190 (0.8 wt %) | 28.97 | 28.97 | 28.97 | 28.97 |
| Water | 20.32 | 17.68 | 15.05 | 9.79 |
| Total | 100 | 100 | 100 | 100 |

[1]Dow Chemical Company
[2]DuPont
[3]Sasol Germany

Figure 9:
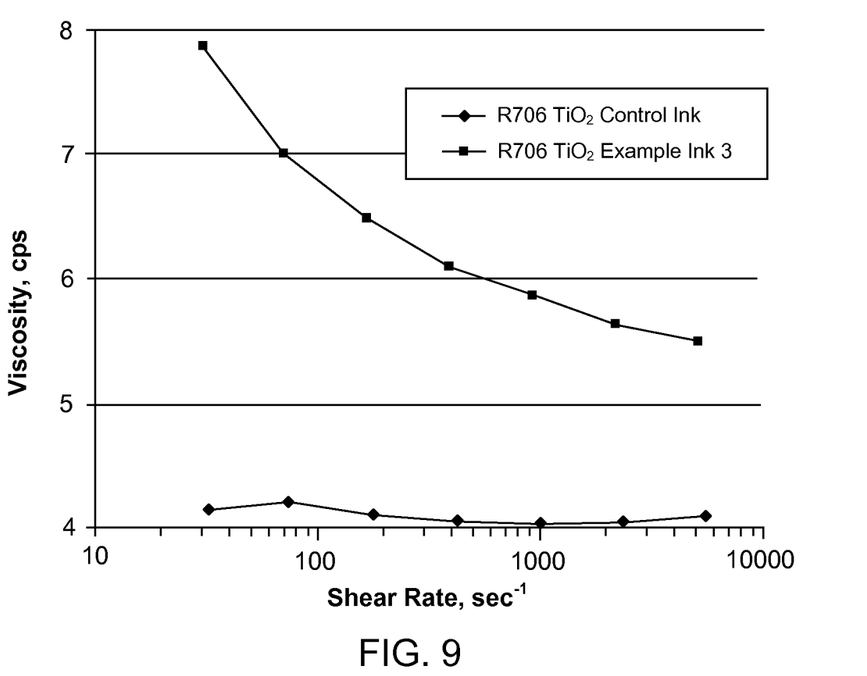
FIG. 9 is a graph depicting the non-Newtonian characteristic of white inks prepared in accordance with examples of the present disclosure.

Rheology profiles were prepared for the Control Ink and Example Ink 3 using an m-VROC capillary viscometer available from Rheosense, Inc. As shown in FIG. 9, the Control Ink and Example Ink 3 were compared for non-Newtonian or shear thinning characteristics. Essentially, the impact of 2 wt % of boehmite alumina nano-particles (about 10 nm to 13 nm average size) significantly enhanced the non-Newtonian characteristic of the respective inks. For example, the Control Ink behaved more like a low viscosity Newtonian fluid; whereas after the addition of 2 wt % (based on the pigment weight) of the boehmite alumina nano-particles, the white ink acquired non-Newtonian properties (at only about 15 wt % pigment content), i.e. 10 sec$^{-1}$ was more than about 30% higher than 1000 sec$^{-1}$. The non-Newtonian behavior was measured as the solids were fully dispersed (not settled) in the ink. When pigment is settled with the amphoteric alumina particles as a flocculated mass, within the mass where the settling is present, the non-Newtonian behavior of this portion of the fluid is even greater.

Furthermore, X-ray photos of sediment in test tubes with cone-shaped bottoms produced at 7 days of pigment settling for each White Ink in Table 1 revealed that as the amphoteric boehmite alumina particles increased in concentration (from 0 wt % to 0.5 wt % to 1 wt % to 2 wt %), a looser flocculated mass resulted. For example, solids in the Control ink settled after 7 days at the bottom of the test tube with a dark mass (in the X-ray) of densely packed pigment that was not easily resuspendible. As the boehmite content was increased, less and less of the densely packed pigment was present.

While the disclosure has been described with reference to certain examples, various modifications, changes, omissions, and substitutions can be made without departing from the spirit of the disclosure. It is intended, therefore, that the present disclosure be limited only by the scope of the following claims.

What is claimed is:

1. A non-Newtonian white ink, comprising:
   an aqueous ink vehicle;
   from 5 wt % to 60 wt % of white colorant, comprising:
      white metal oxide pigment having an average particulate size from 100 nm to 2,000 nm,
      an alumina coating on the white metal oxide pigment forming an alumina-coated pigment, and
      a polymeric dispersant associated with a surface of the alumina-coated pigment; and
   from 0.1 wt % to 5 wt % of amphoteric alumina particles dispersed in the aqueous ink vehicle, wherein the amphoteric alumina particles have an average particles size from 2 nm to less than 100 nm.

2. The non-Newtonian white ink of claim 1, wherein the alumina coating further comprises silica.

3. The non-Newtonian white ink of claim 1, wherein the non-Newtonian white ink comprises 5 wt % to 50 wt % white metal oxide pigment, 0.05 wt % to 10 wt % alumina in the alumina coating, 0.005 wt % to 5 wt % polymeric dispersant; and from 0.5 wt % to 3 wt % amphoteric alumina particles having an average particle size from 5 nm to 30 nm.

4. The non-Newtonian white ink of claim 1, wherein the white metal oxide pigment includes titanium dioxide particles, zinc oxide particles, zirconium oxide particles, or combinations thereof.

5. The non-Newtonian white ink of claim 1, wherein the non-Newtonian white ink further comprises latex particles having a glass transition temperature from −20° C. to 130° C.

6. The non-Newtonian white ink of claim 1, wherein the polymeric dispersant includes a non-ionic or predominantly non-ionic dispersant defined by an acid number not higher than 100 mg KOH/g based on dry polymer weight, and wherein the polymeric dispersant further comprises an anionic anchoring group attached to the alumina coating.

7. The non-Newtonian white ink of claim 1, wherein the polymeric dispersant further includes an anionic dispersant defined by having an acid number higher than 100 mg KOH/g based on dry polymer weight attached to the alumina coating.

8. The non-Newtonian white ink of claim 1, wherein the non-Newtonian white ink is in an agitated state so that the white colorant and the amphoteric alumina particles are fully suspended in the non-Newtonian white ink.

9. The non-Newtonian white ink of claim 1, wherein the white colorant and the amphoteric alumina particles are in the form of a weakly associated flocculated mass upon settling of solids in the non-Newtonian white ink.

10. A method of making a non-Newtonian white ink, comprising:
milling a mixture of a white metal oxide pigment having an alumina coating and a polymeric dispersant in a water-based carrier to form a pigment dispersion;
combining ink vehicle with the pigment dispersion to form a white ink with suspended white colorant; and
adding amphoteric alumina particles to the mixture, the pigment dispersion, the white ink, or combination thereof.

11. The method of claim 10, further comprising allowing the non-Newtonian white ink to destabilize causing the suspended white colorant and the amphoteric alumina particles to form a flocculated mass.

12. The method of claim 10, further comprising admixing latex particles to the mixture, the pigment dispersion, the white ink, or combination thereof, wherein the non-Newtonian white ink comprises:
from 5 wt % to 60 wt % of the suspended white colorant having an average particle size from 100 nm to 2,000 nm;
from 0.05 wt % to 15 wt % of the alumina coating;
from 0.005 wt % to 5 wt % of the polymeric dispersant;
from 0.1 wt % to 5 wt % alumina particles having an average particle size from 2 nm to less than 100 nm; and
from 2 wt % to 30 wt % of the latex particles having a glass transition temperature from −20° C. to 130° C.

13. A fluid set for inkjet imaging, comprising:
a non-Newtonian white ink, comprising:
an aqueous ink vehicle,
from 5 wt % to 60 wt % of white colorant, comprising:
white metal oxide pigment having an average particulate size from 100 nm to 2,000 nm,
an alumina coating on the white metal oxide pigment forming an alumina-coated pigment, and
a polymeric dispersant associated with a surface of the alumina-coated pigment, and
from 0.1 wt % to 5 wt % of amphoteric alumina particles dispersed in the aqueous ink vehicle having an average particle size from 2 nm to less than 100 nm; and
a fixer fluid, comprising:
aqueous fixer vehicle, and
from 0.1 wt % to 25 wt % cationic polymer.

14. The fluid set of claim 13, wherein the non-Newtonian white ink is formulated for inkjet application upon agitation to resuspend white colorant and the amphoteric alumina particles, and wherein the fixer fluid is formulated for inkjet application having a viscosity from 1 cP to 35 cP at 25° C.

15. The fluid set of claim 13, wherein the non-Newtonian white ink is formulated for inkjet application upon agitation to resuspend white colorant and the amphoteric alumina particles, and wherein the fixer fluid is formulated for analog application having a viscosity from 1 cP to 500 cP at 25° C.

16. The fluid set of claim 13, wherein the alumina coating of the non-Newtonian white ink further comprises silica.

17. The fluid set of claim 13, wherein the non-Newtonian white ink comprises 5 wt % to 50 wt % white metal oxide pigment, 0.05 wt % to 10 wt % alumina in the alumina coating, 0.005 wt % to 5 wt % polymeric dispersant; and from 0.5 wt % to 3 wt % amphoteric alumina particles having an average particle size from 5 nm to 30 nm.

18. The fluid set of claim 13, wherein:
the white metal oxide pigment includes titanium dioxide particles, zinc oxide particles, zirconium oxide particles, or combinations thereof,
the non-Newtonian white ink further comprises latex particles having a glass transition temperature from −20° C. to 130° C., or
both.

19. The fluid set of claim 13, wherein the polymeric dispersant includes a non-ionic or predominantly non-ionic dispersant defined by an acid number not higher than 100 mg KOH/g based on dry polymer weight, and wherein the polymeric dispersant further comprises an anionic anchoring group attached to the alumina coating.

20. The fluid set of claim 13, wherein the polymeric dispersant further includes an anionic dispersant defined by having an acid number higher than 100 mg KOH/g based on dry polymer weight attached to the alumina coating.

* * * * *